(12) United States Patent
Tetsuka et al.

(10) Patent No.: US 9,132,771 B2
(45) Date of Patent: Sep. 15, 2015

(54) TURN SIGNAL CANCELING DEVICE FOR A LATERALLY TILTING VEHICLE

(71) Applicant: HONDA MOTOR CO., LTD., Minato-Ku, Tokyo (JP)

(72) Inventors: Takashi Tetsuka, Wako (JP); Takashi Hotei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 14/185,498

(22) Filed: Feb. 20, 2014

(65) Prior Publication Data

US 2014/0240119 A1 Aug. 28, 2014

(30) Foreign Application Priority Data

Feb. 28, 2013 (JP) .................................. 2013-038316

(51) Int. Cl.
 *B60Q 1/40* (2006.01)
(52) U.S. Cl.
 CPC ........................................ *B60Q 1/40* (2013.01)
(58) Field of Classification Search
 CPC ........................................................ B60Q 1/40
 USPC .................................... 340/465, 476; 701/36
 See application file for complete search history.

(56) References Cited

U.S. PATENT DOCUMENTS

| 4,792,785 | A | 12/1988 | Yukio et al. |
| 6,268,794 | B1* | 7/2001 | Tzanev ........................ 340/475 |
| 6,304,804 | B1* | 10/2001 | DeBoni .......................... 701/36 |
| 8,941,482 | B1* | 1/2015 | Gouverneur .................. 340/465 |

FOREIGN PATENT DOCUMENTS

| JP | S58-47639 A | 3/1983 |
| JP | S62-53256 A | 3/1987 |

* cited by examiner

*Primary Examiner* — Daniel Wu
(74) *Attorney, Agent, or Firm* — Carrier Blackman & Associates, P.C.; Joseph P. Carrier; William D. Blackman

(57) ABSTRACT

A turn signal canceling device for a motorcycle includes a straight-ahead travel or turn determining unit for determining whether the motorcycle is travelling straight ahead or is turning and a turn signal cancellation controller which automatically cancels turn signal operation. When a vehicle speed is not greater than a predetermined speed and a driving force is at least a predetermined driving force at a time the straight-ahead travel or turn determining unit determines that the motorcycle is turning, the turn signal cancellation controller enters a standby state. When the straight-ahead travel or turn determining unit determines that the motorcycle is travelling straight ahead during the standby state, the turn signal cancellation controller automatically deactivates a turn signal. When the driving force becomes smaller than the predetermined driving force or turn signal becomes manually deactivated during the standby state, the turn signal cancellation controller returns to the normal operating state.

14 Claims, 5 Drawing Sheets

TURN SIGNAL CANCELING DEVICE FOR A LATERALLY TILTING VEHICLE

CROSS REFERENCE TO RELATED APPLICATIONS

The present invention claims priority under 35 USC 119 based on Japanese patent application No. 2013-038316, filed on 28 Feb. 2013. The entire subject matter of this priority document, including specification claims and drawings thereof, is incorporated by reference herein.

TECHNICAL FIELD

The present invention relates to a turn signal canceling device for a laterally tilting (or rocking) vehicle which device automatically deactivates a turn signal.

BACKGROUND ART

Japanese Patent Laid-Open No. Sho 58-47639 (JP 58-47639) describes determining whether a vehicle is traveling straight ahead or is cornering from a steering angle of handlebars, and performing turn signal cancellation when it is determined that the vehicle is travelling straight ahead.

Japanese Patent Laid-Open No. Sho 62-53256 (JP 62-53256) describes using a difference between the rotational frequencies of a front wheel and a rear wheel, which difference is involved in cornering, to determine that a vehicle is travelling straight ahead when the difference between the rotational frequencies of the front wheel and the rear wheel is small and to determine that the vehicle is cornering when the difference between the rotational frequencies of the front wheel and the rear wheel is large. This reference also describes performing motorcycle automatic turn signal cancellation on the basis of the determination results.

PROBLEM TO BE SOLVED BY THE INVENTION

However, in the case of a laterally tilting vehicle such as a motorcycle, when for example an obstacle is detected during cornering, a steering angle of handlebars may be locally decreased or a difference between the rotational frequencies of a front wheel and a rear wheel may be locally decreased even in the middle of the cornering in order to avoid the obstacle. In this case, the techniques described in JP 58-47639 and JP 62-53256 perform turn signal cancellation. Therefore, the turn signal cancellation is performed automatically even during cornering (turning), so that the driver needs to turn on a turn signal again.

SUMMARY OF THE INVENTION

It is accordingly an object of the present invention to provide a turn signal canceling device for a laterally tilting vehicle in which device the accuracy of turn signal cancellation is improved.

A turn signal canceling device (100) for a laterally tilting vehicle (10) according to the present invention has at least the following aspects. In the following description of these aspects of the present invention reference symbols in parentheses are provided and given in accordance with the reference symbols in the accompanying drawings depicting a present exemplary embodiment of the invention in order to facilitate understanding of the present invention. The present invention should not be construed as being limited to the elements identified by the reference symbols or to the present exemplary embodiment of the invention.

According to a first aspect of the present invention there is provided a turn signal canceling device (100) for a laterally tilting vehicle (10) comprising: a straight-ahead travel or turn determining unit (126) for determining whether the laterally tilting vehicle (10) is travelling straight ahead or is turning; a turn signal cancellation controller (128) for automatically deactivating a turn signal (102) based on a result of determination of the straight-ahead travel or turn determining unit (126); a vehicle speed detector (122) which detects a vehicle speed; and a driving force detector (124) which detects a driving force imparted to the vehicle. When the vehicle speed is equal to or lower than a predetermined speed and the driving force is equal to or larger than a predetermined driving force at a time when the straight-ahead travel or turn determining unit (126) determines that the laterally tilting vehicle (10) is turning, the turn signal cancellation controller (128) enters a standby state for automatically deactivating the turn signal which is different from a normal operating state thereof. When the straight-ahead travel or turn determining unit (126) determines that the laterally tilting vehicle (10) is travelling straight ahead during the standby state, the turn signal cancellation controller (128) automatically deactivates the turn signal (102). When the driving force becomes smaller than the predetermined driving force or the turn signal (102) is manually deactivated during the standby state, the turn signal cancellation controller (128) cancels the standby state and returns to the normal operating state.

According to a second aspect of the present invention, in addition to the first aspect, the driving force detector (124) is an acceleration detector which detects a vehicle acceleration. The turn signal cancellation controller (128) determines that the driving force is equal to or larger than the predetermined driving force when the vehicle acceleration is equal to or larger than a predetermined acceleration.

According to a third aspect of the present invention, in addition to the first and second aspects, the turn signal canceling device (100) further includes a rotational speed detector (106 and 108) which detects a rotational speed of a vehicle wheel. The acceleration detector detects the vehicle acceleration based on the rotational speed detected by the rotational speed detector (106 and 108).

According to a fourth aspect of the present invention, in addition to the third aspect, the rotational speed detector (106) detects the rotational speed of a driven vehicle wheel (18).

According to a fifth aspect of the present invention, in addition to the first-fourth aspects, the turn signal canceling device (100) further includes a turn signal operating unit (104) which gives an instruction to activate or deactivate the turn signal (102). The turn signal cancellation controller (128) includes a timer (128a). The timer (128a) is started when an operation of the turn signal operating unit (104) for giving an instruction to activate the turn signal (102) is performed, and is reset when the turn signal (102) is deactivated. When the vehicle speed is higher than the predetermined speed and a time clocked by the timer (128a) is equal to or more than a predetermined time, the turn signal cancellation controller (128) automatically deactivates the turn signal (102) irrespective of whether the turn signal cancellation controller is in the standby state or the normal operating state.

According to a sixth aspect of the present invention, in addition to the first-fifth aspects, the straight-ahead travel or turn determining unit (126) determines whether the laterally tilting vehicle (10) is travelling straight ahead or is turning on a basis of a ratio between rotational speeds of a front vehicle wheel and a rear vehicle wheel.

EFFECTS OF THE INVENTION

According to the first aspect of the present invention, when the vehicle speed is equal to or lower than the predetermined speed and the driving force imparted to the vehicle is equal to or larger than the predetermined driving force in a case where it is determined that the laterally tilting vehicle is turning, an automatic deactivation standby state of the turn signal cancellation controller (128) is set which is different from it normal operating state. When it is determined that the laterally tilting vehicle is travelling straight ahead during the standby state, the turn signal is automatically deactivated. When the driving force imparted to the vehicle becomes smaller than the predetermined driving force or the turn signal becomes inactive during the standby state, the standby state is cancelled and the turn signal cancellation controller (128) returns to its normal operating state. Therefore, turn signal cancellation is not performed, for example, even when the driver effects a sudden obstacle avoidance maneuver or the like which does not involve a driving force equal to or larger than the predetermined driving force during the turn. Turn signal cancellation can still be automatically performed at the time of an end of normal cornering involving the predetermined driving force, and thus the accuracy of the turn signal cancellation can be improved. As is known, the laterally tilting vehicle raises the vehicle body thereof from a banked orientation thereof, assumed during a turning operation, using the driving force of the rear wheel. Thus, when the driver has an intention of ending cornering, a driving force equal to or larger than the predetermined driving force is generated. Therefore, turn signal cancellation is not performed when a driving force equal to or larger than the predetermined driving force is not involved. Thereby the accuracy of the turn signal cancellation can be improved by the present invention.

According to the second aspect of the present invention, it is determined that the detected driving force is equal to or larger than the predetermined driving force when the vehicle acceleration is equal to or larger than the predetermined acceleration. Thus, whether the driver intends to apply the driving force can be determined with a simple constitution.

According to the third aspect of the present invention, the vehicle acceleration is detected based on the rotational speed detected by the rotational speed detector. Thus, acceleration information can be obtained easily.

According to the fourth aspect of the present invention, the rotational speed of the driven vehicle wheel that reflects speed with respect to a road surface is detected. Therefore, acceleration with respect to the road surface can be detected accurately.

According to the fifth aspect of the present invention, a lane change rather than a turn at an intersection is considered to be made when the vehicle has a certain vehicle speed during the use of a turn signal. Therefore, when the vehicle speed is higher than the predetermined speed and the time clocked by the timer is equal to or more than the predetermined time, the turn signal is automatically deactivated by the turn signal cancellation controller. Thus, turn signal cancellation can be performed in appropriate timing without need for increasing the accuracy of straight-ahead travel or turn determination. That is, in the case of a lane change, the radius of curvature of the turn is very large, and thus highly accurate straight-ahead travel or turn determination needs to be made. However, according to the fifth aspect, turn signal cancellation is performed by the turn signal cancellation controller based on time in the case of a lane change, and thus it is unnecessary to increase the accuracy of straight-ahead travel or turn determination more than necessary.

According to the sixth aspect of the present invention, whether the laterally tilting vehicle is travelling straight ahead or is turning is determined based on the ratio between the rotational speeds of the front vehicle wheel and the rear vehicle wheel. Thus, a sensor for detecting whether the laterally tilting vehicle is travelling straight ahead or is turning does not need to be provided separately, which results in lower cost of the turn signal canceling device according to the present invention.

DETAILED DESCRIPTION OF MODE FOR CARRYING OUT THE INVENTION

A present exemplary embodiment of a turn signal canceling device for a laterally tilting vehicle according to the present invention will hereinafter be given and described in detail with reference to the accompanying drawings.

Figure 1:
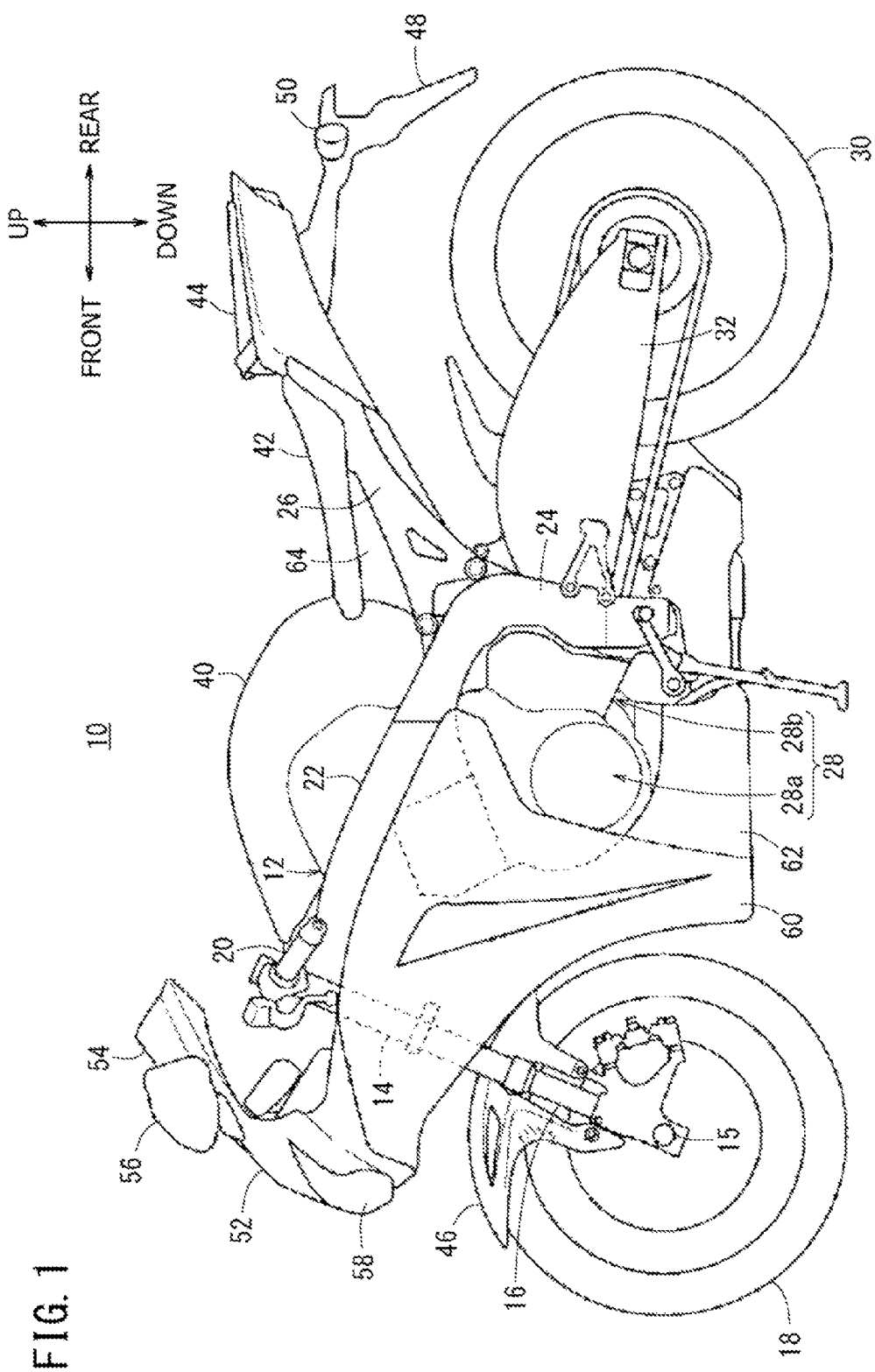
FIG. 1 is a side view of a laterally tilting vehicle in the form of a motorcycle including a turn signal canceling device according to an exemplary embodiment of the present invention.

FIG. 1 is a side view of a motorcycle 10 as a kind of laterally tilting vehicle including a turn signal canceling device according to an present exemplary embodiment of the invention. Incidentally, unless otherwise specified, a forward-rearward direction and an upward-downward direction will be described according to arrow directions shown in FIG. 1, and a left-right direction will be described according to a direction as viewed from a driver seated on a vehicle body of the motorcycle.

The motorcycle 10 includes: a vehicle body frame 12; a head pipe 14 provided to a front end portion of the vehicle body frame 12; a pair of left and right front fork members 16 rotatably supported by the head pipe 14; a front wheel (wheel) 18 as a driven wheel rotatably supported by the pair of left and right front fork members 16; and steerable bar-shaped handlebars 20 attached to an upper portion of the pair of left and right front fork members 16.

The vehicle body frame 12 includes: a pair of left and right main frames 22 extending rearward from the head pipe 14; a pair of left and right pivot plates 24 provided to the rear side of the pair of left and right main frames 22; and a pair of left and right seat frames 26 provided to the pair of left and right pivot plates 24 and extending rearward and obliquely upward. The pair of left and right main frames 22 is provided with a power unit 28 that generates power. A swing arm 32 that rotatably supports a rear wheel (wheel) 30 as a driving wheel is swingably supported by the pivot plates 24. The power unit 28 houses an engine 28a and a transmission 28b within a case of the power unit 28.

A fuel tank 40 for storing a fuel is provided on the pair of left and right main frames 22. A driver seat 42 on which a driver is to be seated is provided in the rear of the fuel tank 40 and on the pair of left and right seat frames 26. A passenger seat 44 on which a passenger is to be seated is provided in the rear of the driver seat 42. A front fender 46 is provided to the pair of left and right front fork members 16. A rear fender 48 is provided to a rear portion of the pair of left and right seat frames 26. The rear fender 48 supports a rear turn signal 50.

The motorcycle 10 further includes: an upper cowl 52 provided to the vehicle body frame 12 to protect a front of the motorcycle; a windscreen 54 provided on the upper cowl 52; a rearview mirror 56 provided to an upper portion of the upper cowl 52 so that the driver can check to the rear of the motorcycle; a headlight 58 provided to a front portion of the upper cowl 52 to irradiate the front; a middle cowl 60 for protecting a front side portion of the motorcycle 10; an under cover 62 provided to a lower portion of the middle cowl 60 and extending to the rear of the vehicle; and a side cover 64 provided on the seat frames 26 to cover a part from an upper portion of the seat frames 26 to a lower portion of the driver seat 42. The rearview mirror 56 includes a front turn signal.

Figure 2:
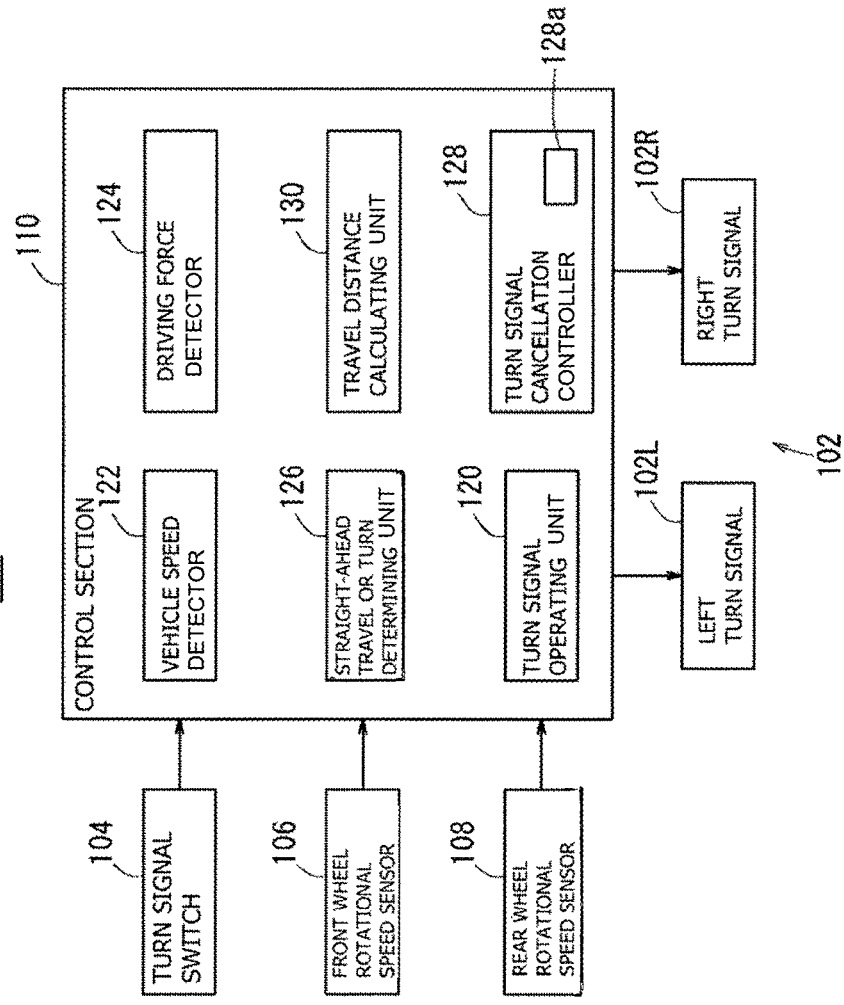
FIG. 2 is a functional block diagram of the turn signal canceling device of FIG. 1.

FIG. 2 is a functional block diagram of a turn signal canceling device 100 according to an present exemplary embodiment of the invention. The turn signal canceling device 100 includes a left turn signal 102L, a right turn signal 102R, a turn signal switch (turn signal operating unit) 104, a front wheel rotational speed sensor (rotational speed detector) 106, a rear wheel rotational speed sensor (rotational speed detector) 108, and a control section 110. Incidentally, the left turn signal 102L and the right turn signal 102R may be referred to collectively as turn signals 102.

The left turn signal 102L and the right turn signal 102R are each formed by the front turn signal and the rear turn signal 50. That is, the front turn signal has a left front turn signal and a right front turn signal. The rear turn signal 50 has a left rear turn signal and a right rear turn signal. The left turn signal 102L is formed by the left front turn signal and the left rear turn signal. The right turn signal 102R is formed by the right front turn signal and the right rear turn signal.

The turn signal switch 104 is a switch provided in the vicinity of the handlebars 20 for turning on (including blinking) one of the left turn signal 102L and the right turn signal 102R. The turn signal switch 104 has a lever movable in different directions, which lever gives an instruction to turn on the left turn signal 102L or the right turn signal 102R. The turn signal switch 104 outputs an operating signal corresponding to an operation of the driver to the control section 110.

The front wheel rotational speed sensor 106 is provided to a rotating shaft with which the front wheel 18 rotates. The front wheel rotational speed sensor 106 detects a rotational speed Vrf of the front wheel 18, and outputs the detected rotational speed Vrf to the control section 110. The rear wheel rotational speed sensor 108 is provided to a rotating shaft such as a countershaft for rotating the rear wheel 30. The rear wheel rotational speed sensor 108 detects a rotational speed Vrr of the rear wheel 30, and outputs the detected rotational speed Vrr to the control section 110. The front wheel rotational speed sensor 106 and the rear wheel rotational speed sensor 108 are used also for other control functions such as ABS (Anti-lock Brake System) control and TCS (Traction Control System) control. Incidentally, in a case where the motorcycle 10 is of a motor scooter type, the rear wheel rotational speed sensor 108 may be provided to a gear on the rear wheel 30 side of a centrifugal clutch or the like. Incidentally, while the rotational speeds will be described as circumferential speeds of the wheels, there is no problem when the rotational speeds are rotational frequencies, sensor pulses, or the like proportional to the rotational speeds.

The control section 110 includes turn signal operating unit 120, vehicle speed detector 122, driving force detector 124, straight-ahead travel or turn determining unit 126, turn signal cancellation controller 128, and travel distance calculating unit 130. The control section 110 includes at least a computer formed by a CPU or the like not shown in the figures and a memory storing a program and the like. The computer reads the program stored in the memory, and thereby functions as the control section 110 according to the present embodiment.

The turn signal operating unit 120 activates and deactivates the left turn signal 102L or the right turn signal 102R according to an operation of the turn signal switch 104. For example, when the driver moves the lever of the turn signal switch 104 to the direction to turn left (a left turn), the turn signal operating unit 120 turns on (activates) the left turn signal 102L. In addition, when the driver moves the lever of the turn signal switch 104 to the direction to turn right (a right turn), the turn signal operating unit 120 turns on (activates) the right turn signal 102R. Incidentally, when the lever of the turn signal switch 104 is pressed, the turn signal operating unit 120 also turns off the left turn signal 102L or the right turn signal 102R.

The vehicle speed detector 122 detects the speed (vehicle speed) V of the motorcycle 10 using the rotational speed Vrf of the front wheel 18 which is detected by the front wheel rotational speed sensor 106. Incidentally, the vehicle speed detector 122 may detect the vehicle speed V using the rotational speed Vrr of the rear wheel 30 which is detected by the rear wheel rotational speed sensor 108.

The driving force detector 124 detects a driving force $\tau$ imparted to the vehicle. There is a correlation between the driving force $\tau$ and the acceleration (vehicle acceleration) A of the motorcycle 10 (it can be determined that a large vehicle acceleration A means a large driving force $\tau$). Thus, the driving force detector 124 in the present embodiment may indirectly detects the driving force $\tau$ by detecting the vehicle acceleration A. That is, the driving force detector 124 functions as acceleration detector. The driving force detector 124 detects the vehicle acceleration A based on the rotational speed Vrf of the front wheel 18 which rotational speed Vrf is detected by the front wheel rotational speed sensor 106 or the vehicle speed V detected by the vehicle speed detector 122. Incidentally, in the present embodiment, the vehicle speed V and the rotational speed Vrf may be detected by the same sensor.

Incidentally, the driving force detector 124 may detect the vehicle acceleration A based on the rotational speed Vrr of the rear wheel 30. Here, the driving force $\tau$ is not limited to the force or torque, but it suffices for the driving force $\tau$ to indicate the intention of the driver to apply the driving force to raise the vehicle body. Hence, the driving force detector 124 may be literally a torque sensor that directly detects the driving force $\tau$ imparted to the vehicle, or may detect the driving force $\tau$ from a degree of opening of an accelerator, or may detect the driving force $\tau$ from a degree of opening of a throttle valve of the engine 28a and engine speed. In addition, the driving force detector 124 may be an acceleration sensor (G-sensor) for detecting the vehicle acceleration, or may detect the driving force $\tau$ from an amount of power supplied to a motor in a case of a laterally tilting vehicle which is an electric vehicle.

The straight-ahead travel or turn determining unit 126 determines whether the motorcycle 10 is travelling straight ahead or is turning. Specifically, the straight-ahead travel or turn determining unit 126 calculates a rotational speed ratio Vdiff, which is a ratio (Vrf/Vrr) between the rotational speed Vrf of the front wheel 18, which rotational speed Vrf is detected by the front wheel rotational speed sensor 106, and the rotational speed Vrr of the rear wheel 30, which rotational speed Vrr is detected by the rear wheel rotational speed sensor 108. The unit 126 further determines whether the motorcycle 10 is travelling straight ahead or is turning according to whether a ratio (Vdiff/Vdiff_s) between the calculated rotational speed ratio Vdiff and a preset rotational speed ratio (hereinafter referred to as a straight-ahead travel time rotational speed ratio) Vdiff_s in a case where the motorcycle 10 can be estimated to be travelling straight ahead is equal to or lower than a threshold value TH (for example 1.01). Because the rotational speed Vrf and the rotational speed Vrr are the circumferential speeds of the respective tires on the front and rear wheels, the rotational speed ratio Vdiff is the same value as the straight-ahead travel time rotational speed ratio Vdiff_s when the motorcycle 10 is travelling straight ahead, and the rotational speed ratio Vdiff is a value higher than the straight-ahead travel time rotational speed ratio Vdiff_s when the motorcycle 10 is turning.

The turn signal cancellation controller 128 performs a turn signal cancellation based on straight-ahead travel or turn determination by the unit 126 and also performs a turn signal cancellation not based on straight-ahead travel or turn determination by the unit 126. Operations of the turn signal cancellations will be described later in detail. The turn signal cancellations refer to automatically turning off (deactivating) the left turn signal 102L or the right turn signal 102R. The turn signal cancellation controller 128 includes a timer 128a for clocking time.

The travel distance calculating unit 130 calculates a distance (travel distance) L that the motorcycle 10 has traveled since an operation of the turn signal switch 104 by the driver for giving an instruction to activate a turn signal 102. The travel distance calculating unit 130 may calculate the travel distance L by integrating the vehicle speed V detected by the vehicle speed detector 122, or may calculate the travel distance L on the basis of the rotational speed Vrr of the rear wheel 30 which is detected by the rear wheel rotational speed sensor 108 or the rotational speed Vrf of the front wheel 18 which is detected by the front wheel rotational speed sensor 106.

The operation of the turn signal cancellation based on straight-ahead travel or turn determination by the turn signal canceling device 100 will next be described with reference to a flowchart of FIG. 3. The laterally tilting vehicle or motorcycle 10 raises the vehicle body thereof, from a banked banked orientation of the motorcycle assumed during a turning operation, using the driving force τ imparted to the vehicle by the rear wheel 30. Thus, when the driver has an intention of ending cornering (turning operation), the motorcycle 10 is typically generating a certain driving force τ or larger. The turn signal cancellation based on straight-ahead travel or turn determination according to the present embodiment uses this characteristic so that turn signal cancellation is not performed when the driver effects a sudden obstacle avoidance maneuver or the like which does not involve a certain driving force τ or larger during a turning operation.

First, the turn signal operating unit 120 determines whether the turn signal switch 104 is operated (step S1). When determining in step S1 that the turn signal switch 104 is not operated, the turn signal operating unit 120 remains in step S1 until the turn signal operating unit 120 determines that the turn signal switch 104 is operated. When determining that the turn signal switch 104 is operated, the turn signal operating unit 120 activates a turn signal 102 according to the operation of the turn signal switch 104 (step S2). Incidentally, the timer 128a is started when the operation of the turn signal switch 104 for giving the instruction to activate the turn signal 102 is performed (when the operation of the turn signal 102 is started). The timer 128a is reset when the turn signal 102 is deactivated.

Next, the front wheel rotational speed sensor 106 starts detecting the rotational speed Vrf of the front wheel 18 (step S3), and the rear wheel rotational speed sensor 108 starts detecting the rotational speed Vrr of the rear wheel 30 (step S4). The front wheel rotational speed sensor 106 and the rear wheel rotational speed sensor 108 perform the detections in predetermined cycles.

Next, the vehicle speed detector 122 starts a process of detecting the vehicle speed V using the rotational speed Vrf of the front wheel 18 which is detected in step S3 (step S5). The driving force detector 124 starts detecting the driving force τ (step S6). In step S6, the driving force τ is detected indirectly by detecting the vehicle acceleration A that is in correlation with the driving force r. The driving force detector 124 detects the vehicle acceleration A based on the vehicle speed V detected in step S5.

Next, the straight-ahead travel or turn determining unit 126 determines whether the motorcycle 10 is travelling straight ahead or is turning (step S7). Specifically, the straight-ahead travel or turn determining unit 126 calculates the rotational speed ratio Vdiff (Vdiff=Vrf/Vrr), which is the ratio between the rotational speed Vrf of the front wheel 18, which rotational speed Vrf is detected by the front wheel rotational speed sensor 106, and the rotational speed Vrr of the rear wheel 30, which rotational speed Vrr is detected by the rear wheel rotational speed sensor 108, and determines whether the ratio (Vdiff/Vdiff_s) between the calculated rotational speed ratio Vdiff and the straight-ahead travel time rotational speed ratio Vdiff_s is equal to or lower than the threshold value TH. Then, the straight-ahead travel or turn determining unit 126 determines that the motorcycle 10 is travelling straight ahead when the ratio (Vdiff/Vdiff_s) between the rotational speed ratio Vdiff and the straight-ahead travel time rotational speed ratio Vdiff_s is equal to or lower than the threshold value TH. The straight-ahead travel or turn determining unit 126 determines that the motorcycle 10 is turning when the ratio (Vdiff/Vdiff_s) between the rotational speed ratio Vdiff and the straight-ahead travel time rotational speed ratio Vdiff_s is higher than the threshold value TH. Incidentally, the motorcycle 10 may be provided with a steering angle sensor for detecting the steering angle of the handlebars 20, and the straight-ahead travel or turn determining unit 126 may determine whether the motorcycle 10 is travelling straight ahead or is turning based on a sensor such as the steering angle sensor or a bank angle sensor.

When it is determined in step S7 that the motorcycle 10 is turning, the turn signal cancellation controller 128 determines whether a latest detected vehicle speed V is equal to or lower than a predetermined speed V1 (for example 50 [km/h]) (step S8). When entering an intersection for a turning operation, the driver typically decelerates by applying brakes. Thus, when the motorcycle is turning in an intersection, the vehicle speed V is not higher than the predetermined speed V1.

When determining in step S8 that the vehicle speed V is equal to or lower than the predetermined speed V1, the turn signal cancellation controller 128 determines whether a latest detected driving force τ is equal to or larger than a predetermined driving force τ1 (step S9). In the present embodiment, the driving force τ is detected indirectly by detecting the vehicle acceleration A. Thus, when the vehicle acceleration A is equal to or larger than a predetermined acceleration A1 (for example 0 [km/h$^2$]), the turn signal cancellation controller 128 determines that the driving force τ is equal to or larger than the predetermined driving force τ1. When the driver has an intention of ending a turn at an intersection, the driver raises the vehicle body by accelerating, and thus the vehicle acceleration A is equal to or larger than the predetermined acceleration A1.

When it is determined in step S7 that the motorcycle 10 is travelling straight ahead, when it is determined in step S8 that the vehicle speed V is not equal to or lower than the predetermined speed V1, and when it is determined in step S9 that the driving force τ is not equal to or larger than the predetermined driving force τ1 (when it is determined that the vehicle acceleration A is not equal to or larger than the predetermined acceleration A1), the process returns to step S7.

On the other hand, when it is determined in step S9 that the driving force τ is equal to or larger than the predetermined driving force τ1, that is, when it is determined that the motorcycle 10 is turning, that the vehicle speed V is equal to or lower than the predetermined speed V1, and that the driving force τ is equal to or larger than the predetermined driving force τ1, the turn signal cancellation controller 128 enters a standby state for turn signal cancellation (step S10).

Next, the straight-ahead travel or turn determining unit 126 determines whether the motorcycle 10 is travelling straight ahead or is turning (step S11). When it is determined in step S11 that the motorcycle 10 is turning, the turn signal cancellation controller 128 determines whether a latest detected driving force τ is smaller than the predetermined driving force τ1 (step S12).

When determining in step S12 that the driving force τ is not smaller than the predetermined driving force τ1, the turn signal cancellation controller 128 determines whether the turn signals 102 (the left turn signal 102L and the right turn signal 102R) are inactive (step S13). That is, the turn signals 102 become inactive when the driver presses the lever of the turn signal switch 104 and thus the turn signal operating unit 120 deactivates the turn signals 102.

When it is determined in step S13 that the turn signals 102 are not inactive, the process returns to step S11 to repeat the above-described operation. On the other hand, when determining in step S12 that the driving force τ is smaller than the predetermined driving force τ1, or when determining in step S13 that the turn signals 102 are inactive, the turn signal cancellation controller 128 cancels the standby state (step S14).

When the driving force τ is smaller than the predetermined driving force τ1, it can be estimated that an obstacle avoidance is performed, and the standby state is cancelled to prevent turn signal cancellation from being performed based on straight-ahead travel for avoiding an obstacle. When the turn signals 102 become inactive, the standby state is cancelled because turn signal cancellation does not need to be performed.

Next, the turn signal cancellation controller 128 determines whether a turn signal 102 is operating (step S15). When a turn signal 102 is operating, the process returns to step S7. When the turn signals 102 are inactive (stopped), the process returns to step S1.

When it is determined in step S11 that the motorcycle 10 is travelling straight ahead during the standby state, on the other hand, the turn signal cancellation controller 128 performs turn signal cancellation. That is, the turn signal cancellation controller 128 automatically deactivates the left turn signal 102L or the right turn signal 102R (step S16).

The operation of the turn signal cancellation not based on straight-ahead travel or turn determination by the turn signal canceling device 100 will next be described with reference to a flowchart of FIG. 4. Incidentally, the operation shown in FIG. 4 is performed when one of the left turn signal 102L and the right turn signal 102R starts operating, and is performed in parallel with the operation shown in FIG. 3.

Figure 3:
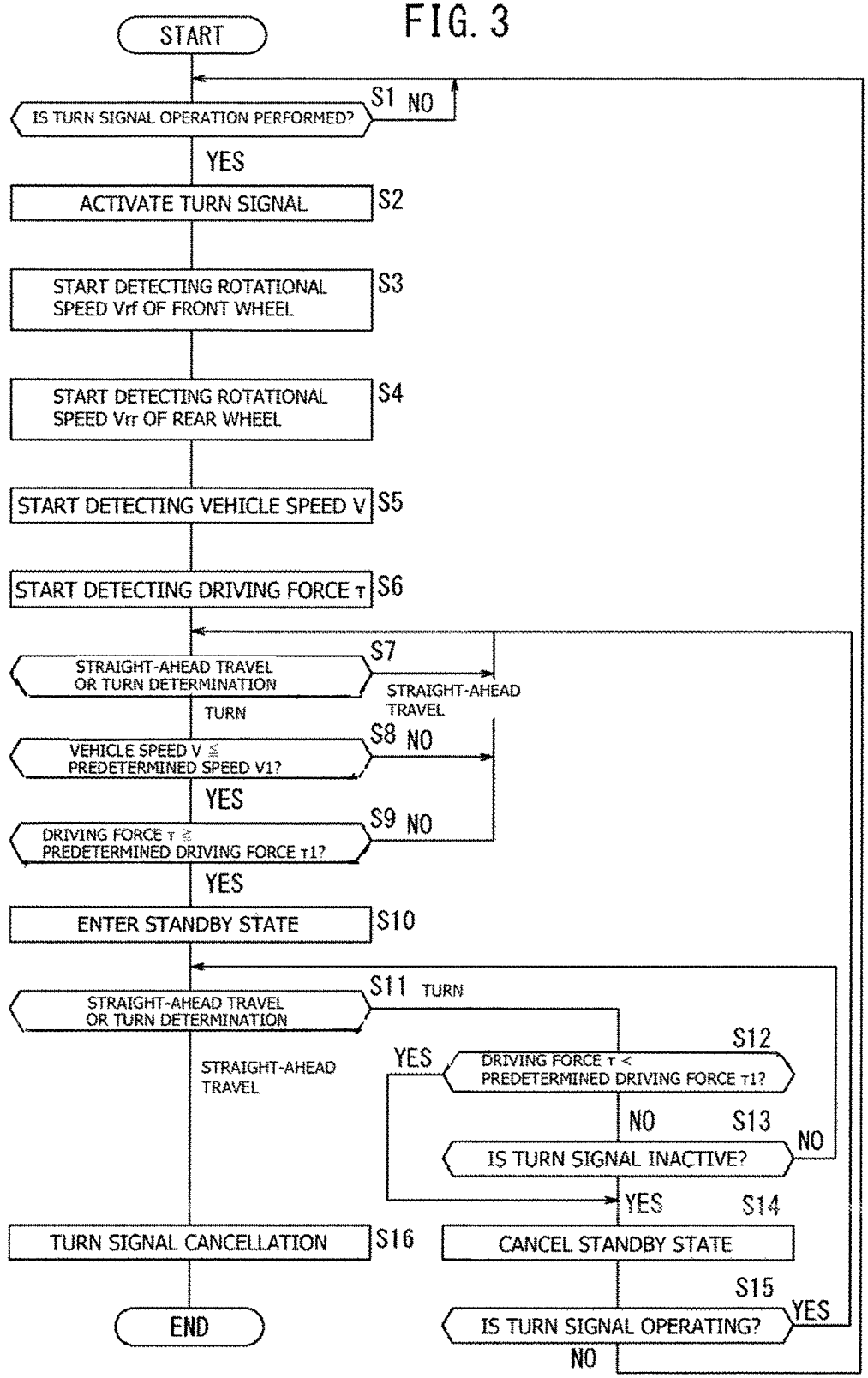
FIG. 3 is a flowchart of an operation of turn signal cancellation based on straight-ahead travel or turn determination by the turn signal canceling device of FIG. 1.
Figure 4:
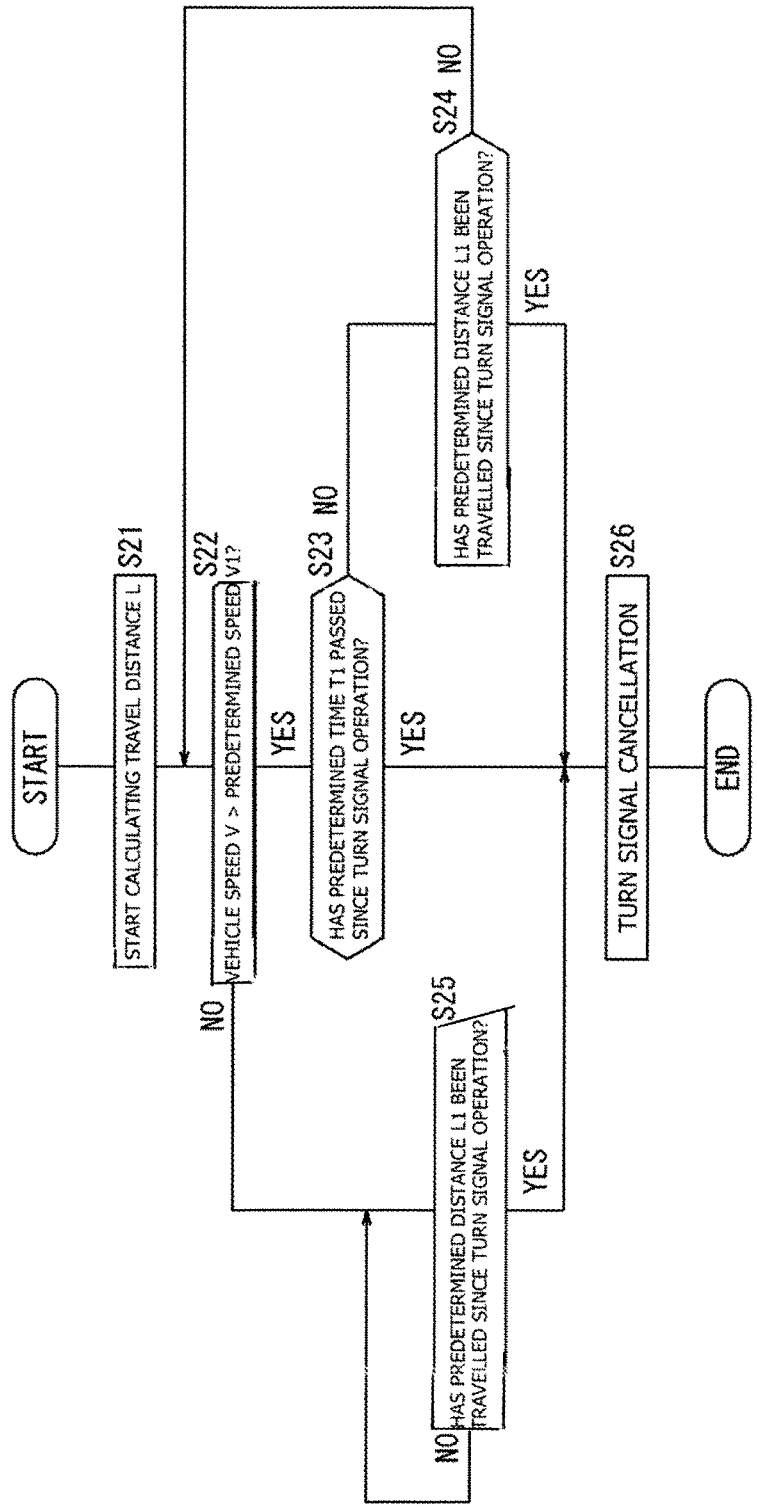
FIG. 4 is a flowchart of an operation of turn signal cancellation not based on straight-ahead travel or turn determination by the turn signal canceling device of FIG. 1.

When the left turn signal 102L or the right turn signal 102R is activated according to an operation of the turn signal switch 104 in step S2 in FIG. 3, the travel distance calculating unit 130 starts calculating a travel distance L traveled since the operation of the turn signal switch 104 (step S21). The travel distance L can be calculated by integrating the vehicle speed V detected in step S5 in FIG. 3, or can also be calculated by using the rotational speed Vrr of the rear wheel 30 which is detected in step S4 in FIG. 3.

Next, the turn signal cancellation controller 128 determines whether the latest vehicle speed V detected in step S5 in FIG. 3 is higher than the predetermined speed V1 (step S22). When the vehicle speed V is higher than the predetermined speed V1, the motorcycle 10 is not considered to be making a turn (a left turn or a right turn) at an intersection.

When determining in step S22 that the vehicle speed V is higher than the predetermined speed V1, the turn signal cancellation controller 128 determines whether a predetermined time T1 (for example 7 seconds) has passed since the operation of the turn signal switch 104 (step S23). This determination is made based on the time clocked by the timer 128a.

When determining in step S23 that the predetermined time T1 has not passed since the operation of the turn signal switch 104, the turn signal cancellation controller 128 determines whether the motorcycle 10 has traveled a predetermined distance L1 (for example 120 m) since the operation of the turn signal switch 104 (step S24). This determination is made based on the travel distance L detected by the travel distance calculating unit 130.

When it is determined in step S24 that the motorcycle 10 has not traveled the predetermined distance L1 since the operation of the turn signal switch 104, the process returns to step S22 to repeat the above-described operation. When determining in step S22 that the vehicle speed V is not higher than the predetermined speed V1, on the other hand, the turn signal cancellation controller 128 determines whether the motorcycle 10 has traveled the predetermined distance L1 since the operation of the turn signal switch 104 (step S25).

When determining in step S25 that the motorcycle 10 has not traveled the predetermined distance L1 since the operation of the turn signal switch 104, the turn signal cancellation controller 128 remains in step S25 until the motorcycle 10 has traveled the predetermined distance L1. When the motorcycle 10 has traveled the predetermined distance L1, the turn signal cancellation controller 128 performs turn signal cancellation (step S26). When the motorcycle 10 has traveled the predetermined distance L1 since the operation of the turn signal switch 104, it can be considered that the motorcycle 10 has completed a turn (a right turn or a left turn) at an intersection or a lane change (changing lanes) or the like. Therefore, turn signal cancellation is performed. Incidentally, the turn signal cancellation is not performed when the turn signals 102 are already inactive (stopped) in step S26.

When determining in step S23 that the predetermined time T1 has passed since the operation of the turn signal switch 104, on the other hand, the turn signal cancellation controller 128 performs turn signal cancellation (step S26). When the vehicle speed V has been higher than the predetermined speed V1 since the operation of the turn signal switch 104 until the predetermined time T1 has passed, it can be considered that the motorcycle 10 is not making a turn at an intersection but changing lanes. Thus, turn signal cancellation is performed after the predetermined time T1 has passed since the operation of the turn signal switch 104.

In addition, when determining in step S24 that the motorcycle 10 has traveled the predetermined distance L1 since the operation of the turn signal switch 104, the turn signal cancellation controller 128 performs turn signal cancellation (step S26). That is, when the travel distance L has become the predetermined distance L1 with the vehicle speed V higher than the predetermined speed V1 before the predetermined time T1 has passed, turn signal cancellation is performed.

Figure 5:
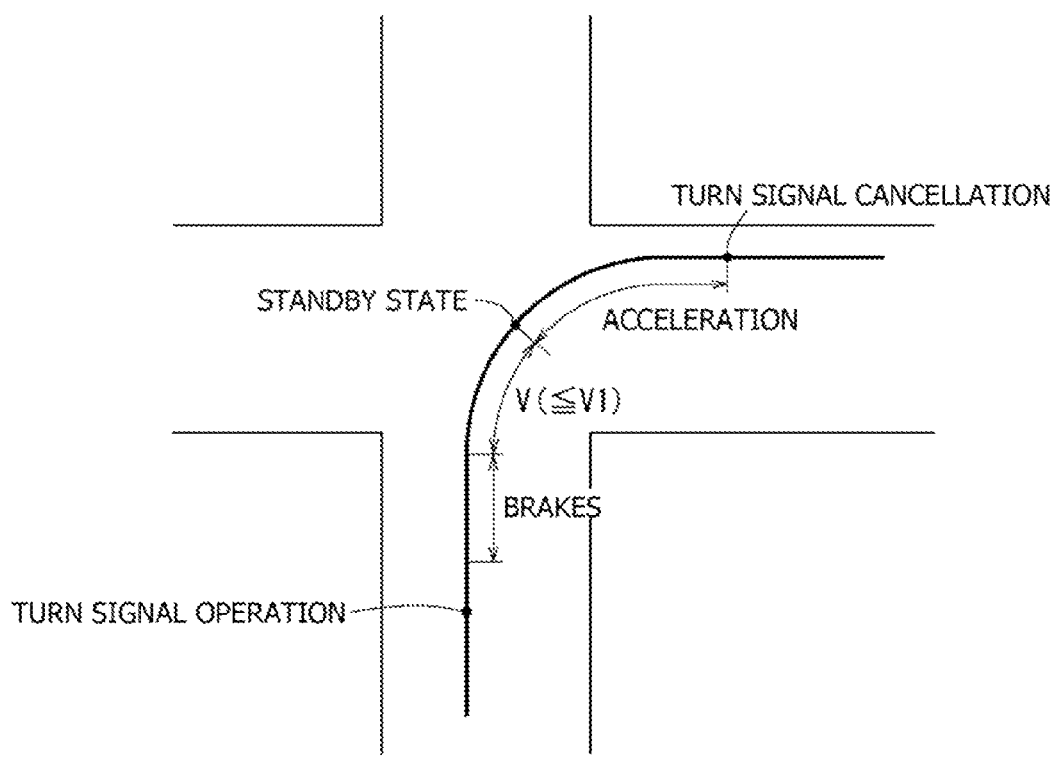
FIG. 5 is a diagram of assistance in explaining turning travel of the motorcycle in an intersection.

FIG. 5 is a diagram of assistance in explaining turning travel of the motorcycle 10 at an intersection. When the motorcycle 10 approaches the intersection, the driver operates the turn signal switch 104 to turn on a turn signal 102. In the example shown in FIG. 5, the motorcycle 10 makes a right turn. Thus, the driver operates the turn signal switch 104 to turn on the right turn signal 102R.

Then, after operating the turn signal switch 104, the driver decelerates by applying brakes. After entering the intersection, the driver makes a right turn while banking the motorcycle to the right. Thereafter, the driver starts accelerating to raise the motorcycle 10 from its banked orientation. The driver makes the motorcycle 10 travel straight ahead at a point in time that the right turn is completed.

Hence, in an initial state in which the motorcycle 10 has entered the intersection, the turn signal 102 is operating, the vehicle speed V is equal to or lower than the predetermined speed V1, and the straight-ahead travel or turn determining unit 126 determines that the motorcycle 10 is turning. However, before the acceleration is started, the vehicle acceleration A is not equal to or larger than the predetermined acceleration A1, and thus the standby state is not set. Then, the standby state is set for the first time when the acceleration is effected in the intersection. Thereafter turn signal cancellation is performed for the first time when the straight-ahead travel or turn determining unit 126 determines that the motorcycle 10 is travelling straight ahead.

In addition, when an operation of the turn signal switch 104 by the driver makes the turn signal 102 inactive during the standby state, or when the vehicle acceleration A is smaller than the predetermined acceleration A1 during the standby state, the standby state is cancelled. Thus, turn signal cancellation is not performed, for example, even when the driver effects a sudden obstacle avoidance maneuver or the like which does not involve a vehicle acceleration A equal to or larger than the predetermined acceleration A1 occurs during the turn. In this case, when the turn signal 102 is operating, the standby state is set after the obstacle avoidance, and turn signal cancellation is performed when normal cornering involving acceleration is ended.

Thus, when the vehicle speed V is equal to or lower than the predetermined speed V1 and the driving force $\tau$ is equal to or larger than the predetermined driving force $\tau 1$ in the case where it is determined that the motorcycle 10 is turning, the standby state is set. When it is determined that the motorcycle 10 is travelling straight ahead during the standby state, the turn signal 102 is automatically deactivated. When the driving force $\tau$ becomes smaller than the predetermined driving force $\tau 1$ or the turn signal 102 becomes inactive during the standby state, the standby state is cancelled. Thus, turn signal cancellation is not performed even when the driver effects a sudden obstacle avoidance maneuver which does not involve a driving force $\tau$ equal to or larger than the predetermined driving force $\tau 1$ during the turn. Turn signal cancellation can be performed at the time of an end of normal cornering involving acceleration, and thus the accuracy of the turn signal cancellation can be improved.

In addition, because it is determined that the driving force $\tau$ is equal to or larger than the predetermined driving force $\tau 1$ when the vehicle acceleration A is equal to or larger than the predetermined acceleration A1, whether the driver intends to apply the driving force $\tau$ can be determined with a simple constitution. Also, because the vehicle acceleration A is detected based on the rotational speed Vrf detected by the front wheel rotational speed sensor 106 or the rotational speed Vrr detected by the rear wheel rotational speed sensor 108, acceleration information can be obtained easily. Further, because the rotational speed Vrf of the front wheel 18 as the driven wheel that reflects speed with respect to a road surface is detected, the vehicle acceleration A with respect to the road surface can be detected accurately.

When the vehicle speed V is higher than the predetermined speed V1 and the time clocked by the timer 128a is equal to or more than the predetermined time T1, the turn signal 102 is automatically deactivated. Thus, even in the case of a lane change rather than a turn at an intersection, turn signal cancellation can be performed in appropriate timing without the accuracy of straight-ahead travel or turn determination being increased. That is, in the case of a lane change, the radius of curvature of the turn is very large, and thus highly accurate straight-ahead travel or turn determination needs to be made. However, the present embodiment performs turn signal cancellation based on time in the case of a lane change, and thus renders it unnecessary to increase the accuracy of straight-ahead travel or turn determination more than necessary.

Incidentally, the foregoing embodiment has been described using the motorcycle 10 as a laterally tilting vehicle. However, the laterally tilting vehicle may be a motor-assisted bicycle, or may be a motor tricycle or the like as long as the vehicle laterally tilts to the inside during cornering. That is, it suffices for the laterally tilting vehicle to make a turn while banking the vehicle body.

The present invention has been described above using a present exemplary embodiment thereof. The technical scope of the present invention, however, is not limited to the scope described in the foregoing embodiment. It is understood by those skilled in the art that various changes or improvements can be made to the foregoing embodiment without departing from the essence of the present invention as reflected in the appended claims. It is apparent from the descriptions set forth in the claims that forms resulting from such changes or improvements can be included in the technical scope of the present invention. In addition, the reference symbols in parentheses provided in the above descriptions are given in accordance with the reference symbols in the accompanying drawings in order to facilitate understanding of the present invention. The present invention should not be construed as being limited to the elements identified by the reference symbols or to the present exemplary embodiment of the invention described above.

DESCRIPTION OF REFERENCE SYMBOLS

10 Motorcycle
12 Vehicle body frame
18 Front wheel
30 Rear wheel
100 Turn signal canceling device
102 Turn signal
102L Left turn signal
102R Right turn signal
104 Turn signal switch
106 Front wheel rotational speed sensor
108 Rear wheel rotational speed sensor 110 Control section
120 Turn signal operating unit
122 Vehicle speed detector
124 Driving force detector
126 Straight-ahead travel or turn determining unit
128 Turn signal cancellation controller
128a Timer
130 Travel distance calculating unit

The invention claimed is:

1. A turn signal canceling device for a laterally tilting vehicle, the turn signal canceling device comprising:
   a straight-ahead travel or turn determining unit for determining whether the laterally tilting vehicle is travelling straight ahead or is turning;
   a turn signal cancellation controller for automatically deactivating a turn signal based on a result of determination of the straight-ahead travel or turn determining unit;
   a vehicle speed detector for detecting a vehicle speed; and
   a driving force detector for detecting a driving force imparted to the vehicle,
   wherein when the vehicle speed is equal to or lower than a predetermined speed and the driving force is equal to or larger than a predetermined driving force at a time when the straight-ahead travel or turn determining unit determines that the laterally tilting vehicle is turning, the turn signal cancellation controller enters a standby state for automatically deactivating the turn signal which is different from a normal operating state thereof,
   when the straight-ahead travel or turn determining unit determines that the laterally tilting vehicle is travelling straight ahead during the standby state, the turn signal cancellation controller automatically deactivates the turn signal, and
   when the driving force becomes smaller than the predetermined driving force or the turn signal is manually deactivated during the standby state, the turn signal cancellation controller cancels the standby state and returns to the normal operating state thereof.

2. The turn signal canceling device for the laterally tilting vehicle according to claim 1,
   wherein the driving force detector is an acceleration detector for detecting a vehicle acceleration, and
   the turn signal cancellation controller determines that the driving force is equal to or larger than the predetermined driving force when the vehicle acceleration is equal to or larger than a predetermined acceleration.

3. The turn signal canceling device for the laterally tilting vehicle according to claim 2, further comprising
   a rotational speed detector for detecting a rotational speed of a vehicle wheel,
   wherein the acceleration detector detects the vehicle acceleration based on the rotational speed detected by the rotational speed detector.

4. The turn signal canceling device for the laterally tilting vehicle according to claim 3,
   wherein the rotational speed detector detects the rotational speed of a driven vehicle wheel.

5. The turn signal canceling device for the laterally tilting vehicle according to claim 1, further comprising:
   a turn signal operating unit for giving an instruction to activate or deactivate the turn signal,
   wherein the turn signal cancellation controller includes a timer, the timer is started when an operation of the turn signal operating unit for giving an instruction to activate the turn signal is performed, and is reset when the turn signal is deactivated, and
   when the vehicle speed is higher than the predetermined speed and a time clocked by the timer is at least a predetermined time, the turn signal cancellation controller automatically deactivates the turn signal irrespective of whether the turn signal cancellation controller is in the standby state or the normal operating state.

6. The turn signal canceling device for the laterally tilting vehicle according to claim 1,
   wherein the straight-ahead travel or turn determining unit determines whether the laterally tilting vehicle is travelling straight ahead or is turning based on a ratio between rotational speeds of a front vehicle wheel and a rear vehicle wheel.

7. The turn signal canceling device for the laterally tilting vehicle according to claim 2, further comprising:
   a turn signal operating unit for giving an instruction to activate or deactivate the turn signal,
   wherein the turn signal cancellation controller includes a timer, the timer is started when an operation of the turn signal operating unit for giving an instruction to activate the turn signal is performed, and is reset when the turn signal is deactivated, and
   when the vehicle speed is higher than the predetermined speed and a time clocked by the timer is at least a predetermined time, the turn signal cancellation controller automatically deactivates the turn signal irrespective of whether the turn signal cancellation controller is in the standby state or the normal operating state.

8. The turn signal canceling device for the laterally tilting vehicle according to claim 7,
   wherein the straight-ahead travel or turn determining unit determines whether the laterally tilting vehicle is travelling straight ahead or is turning based on a ratio between rotational speeds of a front vehicle wheel and a rear vehicle wheel.

9. The turn signal canceling device for the laterally tilting vehicle according to claim 3, further comprising:
   a turn signal operating unit for giving an instruction to activate or deactivate the turn signal,
   wherein the turn signal cancellation controller includes a timer, the timer is started when an operation of the turn signal operating unit for giving an instruction to activate the turn signal is performed, and is reset when the turn signal is deactivated, and
   when the vehicle speed is higher than the predetermined speed and a time clocked by the timer is at least a predetermined time, the turn signal cancellation controller automatically deactivates the turn signal irrespective of whether the turn signal cancellation controller is in the standby state or the normal operating state.

10. The turn signal canceling device for the laterally tilting vehicle according to claim 9,
    wherein the straight-ahead travel or turn determining unit determines whether the laterally tilting vehicle is travelling straight ahead or is turning based on a ratio between rotational speeds of a front vehicle wheel and a rear vehicle wheel.

11. The turn signal canceling device for the laterally tilting vehicle according to claim 4, further comprising:
    a turn signal operating unit for giving an instruction to activate or deactivate the turn signal,
    wherein the turn signal cancellation controller includes a timer, the timer is started when an operation of the turn signal operating unit for giving an instruction to activate the turn signal is performed, and is reset when the turn signal is deactivated, and when the vehicle speed is higher than the predetermined speed and a time clocked by the timer is at least a predetermined time, the turn signal cancellation controller automatically deactivates the turn signal irrespective of whether the turn signal cancellation controller is in the standby state or the normal operating state.

12. The turn signal canceling device for the laterally tilting vehicle according to claim 11, wherein the straight-ahead travel or turn determining unit determines whether the laterally tilting vehicle is travelling straight ahead or is turning based on a ratio between rotational speeds of a front vehicle wheel and a rear vehicle wheel.

13. The turn signal canceling device for the laterally tilting vehicle according to claim 5, wherein the straight-ahead travel or turn determining unit determines whether the laterally tilting vehicle is travelling straight ahead or is turning based on a ratio between rotational speeds of a front vehicle wheel and a rear vehicle wheel.

14. A motorcycle comprising the turn signal canceling device for the laterally tilting vehicle according to claim 1.

* * * * *